(12) United States Patent
Abiko

(10) Patent No.: US 8,787,631 B2
(45) Date of Patent: Jul. 22, 2014

(54) CAPACITIVE SENSOR AND BIOMETRIC IMAGE GENERATING METHOD

(75) Inventor: Yukihiro Abiko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 146 days.

(21) Appl. No.: 13/490,102

(22) Filed: Jun. 6, 2012

(65) Prior Publication Data

US 2012/0250949 A1 Oct. 4, 2012

Related U.S. Application Data

(63) Continuation of application No. PCT/JP2009/070621, filed on Dec. 9, 2009.

(51) Int. Cl.
*G06K 9/00* (2006.01)
*G06T 1/00* (2006.01)

(52) U.S. Cl.
CPC ........................................ *G06T 1/00* (2013.01)
USPC .......................................... 382/124; 382/126

(58) Field of Classification Search
CPC ................... G06K 9/0002; G06K 9/00026
See application file for complete search history.

(56) References Cited

U.S. PATENT DOCUMENTS

| | | | |
|---|---|---|---|
| 5,325,442 A | 6/1994 | Knapp | |
| 5,963,656 A * | 10/1999 | Bolle et al. | 382/124 |
| 2001/0025532 A1 | 10/2001 | Kramer | |
| 2005/0005703 A1 | 1/2005 | Saito et al. | |
| 2005/0123177 A1* | 6/2005 | Abiko | 382/124 |
| 2006/0049834 A1 | 3/2006 | Umeda | |
| 2006/0119369 A1 | 6/2006 | Kawahata et al. | |

FOREIGN PATENT DOCUMENTS

| | | |
|---|---|---|
| JP | 2000-337813 | 12/2000 |
| JP | 2001-56204 | 2/2001 |
| JP | 2001-222706 | 8/2001 |
| JP | 2001-525067 | 12/2001 |
| JP | 2005-30901 | 2/2005 |
| JP | 2005-505065 | 2/2005 |
| JP | 2006-71579 | 3/2006 |
| JP | 2006-162345 | 6/2006 |
| WO | 98/52135 A2 | 11/1998 |
| WO | 03/030091 A1 | 4/2003 |

OTHER PUBLICATIONS

Hideki, Machine Translation of JP 2000/337813.*
International Search Report for PCT/JP2009/070621 mailed Feb. 2, 2010.

* cited by examiner

*Primary Examiner* — Stephen R Koziol
*Assistant Examiner* — Timothy Choi
(74) *Attorney, Agent, or Firm* — Staas & Halsley LLP

(57) ABSTRACT

A capacitive sensor includes a plurality of electrodes each of which outputs an electrical signal corresponding to a capacitance determined by a distance between a surface of the capacitive sensor and an electrical conductor. The plurality of electrodes include electrodes having a first parasitic capacitance and electrodes having a second parasitic capacitance different from the first parasitic capacitance, and are arranged in a prescribed pattern different than a pattern of biometric information of a body part to be read by the capacitive sensor.

7 Claims, 10 Drawing Sheets

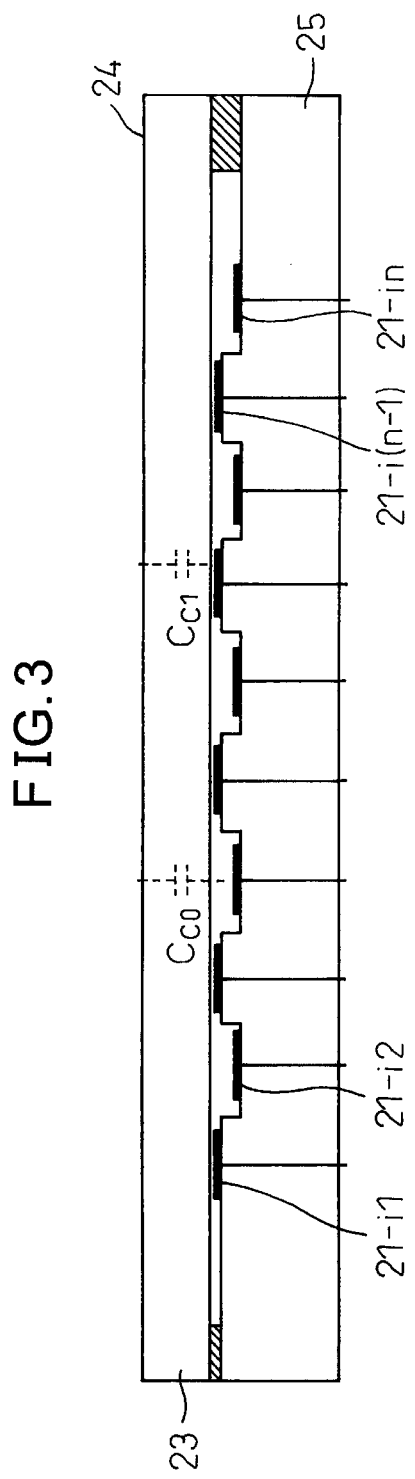

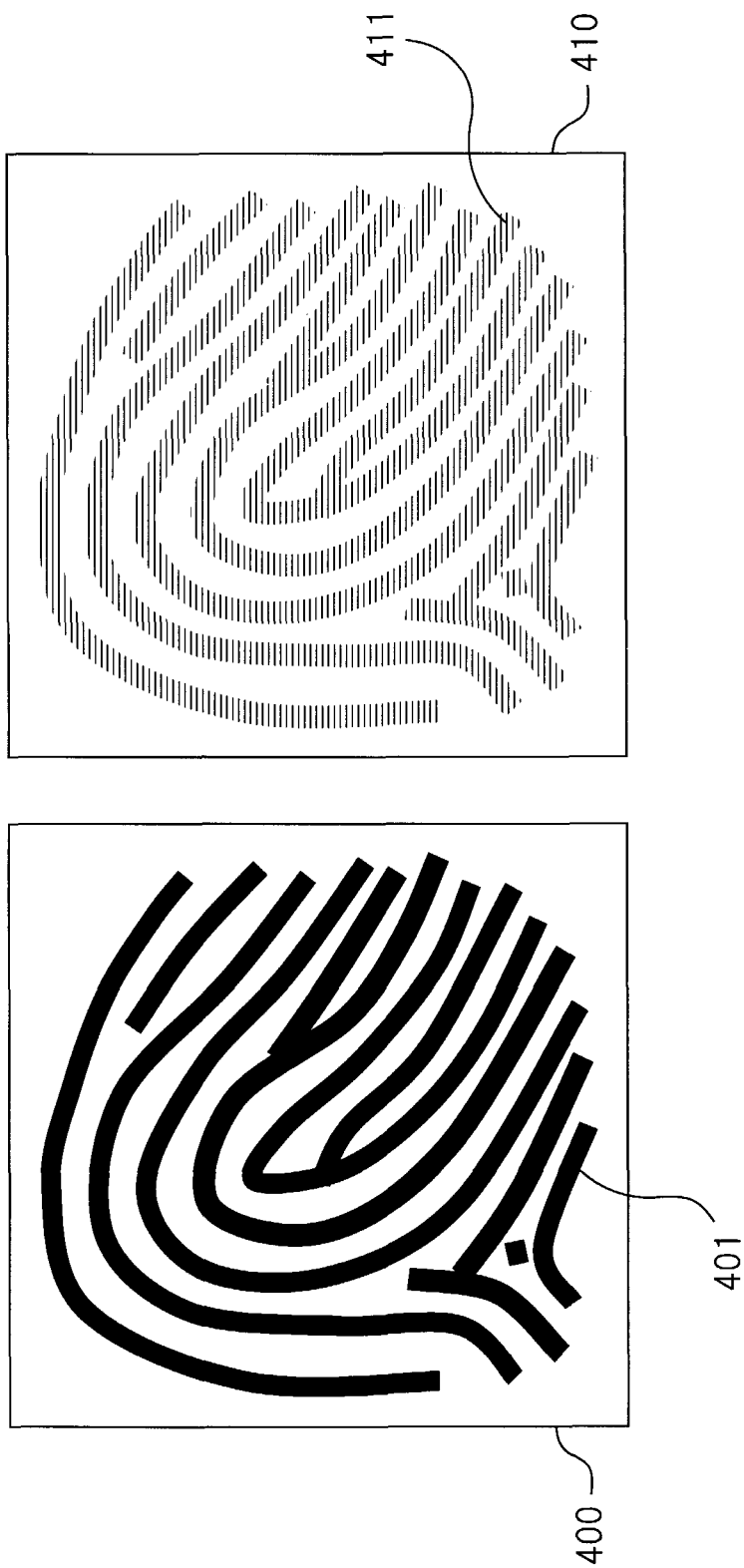

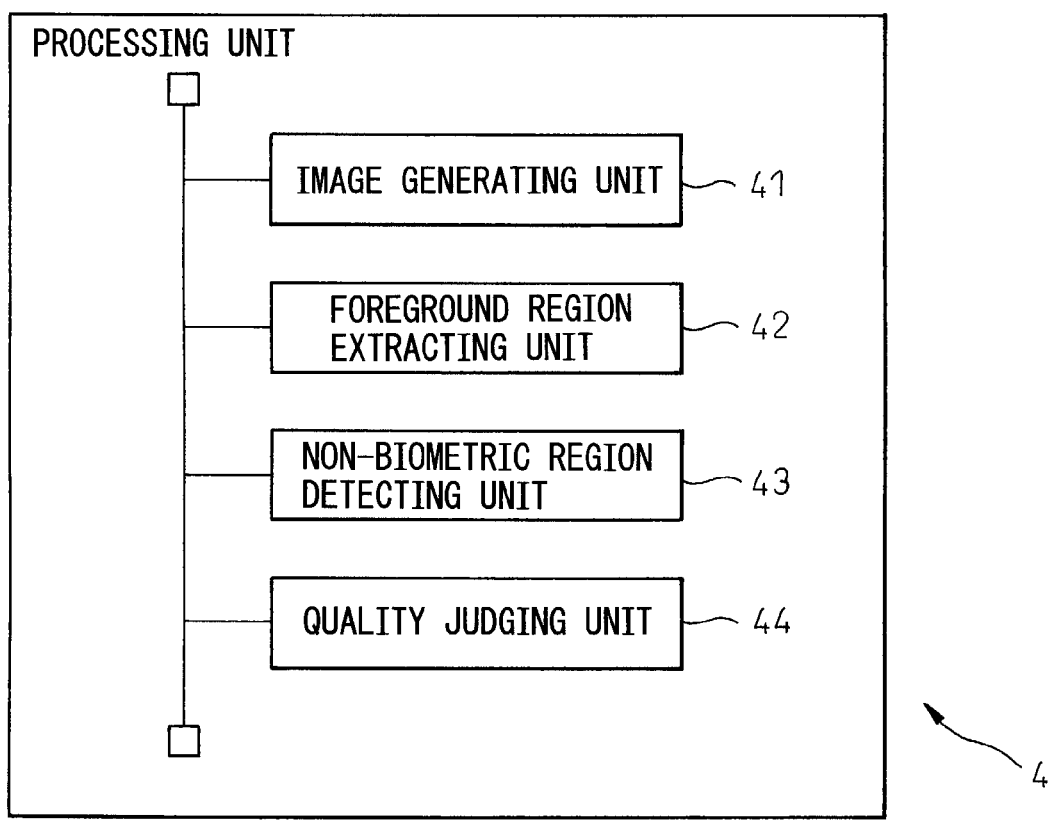

CAPACITIVE SENSOR AND BIOMETRIC IMAGE GENERATING METHOD

CROSS-REFERENCE TO RELATED APPLICATION

This application is a continuation application and is based upon PCT/JP2009/070621, filed on Dec. 9, 2009, the entire contents of which are incorporated herein by reference.

FIELD

The embodiments disclosed herein are related to a capacitive sensor and a biometric image generating method using a capacitive sensor.

BACKGROUND

In recent years, a variety of sensors for sensing the touch of a person's body part or for reading a person's biometric information have been developed. A capacitive sensor has been developed as one such sensor. When a person's body part is placed in contact with or in close proximity to the sensor surface, the capacitive sensor detects a change in capacitance and thereby detects the touch of the body part or converts height variations on the surface of the body part into electrical signals. Such capacitive sensors are widely used, for example, as touch sensors, touch pads, touch panels, fingerprint sensors, etc. (refer, for example, to U.S. Pat. No. 5,325,442, Japanese Laid-open Publication No. 2001-222706, Published Japanese Translation of PCT application No. 2001-525067, Japanese Laid-open Publication No. 2001-56204 and Published Japanese Translation of PCT application No. 2005-505065).

A touch sensor is a sensing device that detects the touch of a person's body part such as a finger when it touches the sensor surface. A touch pad is a device that detects the position at which the sensor surface is touched with the body part and, when the body part is moved across the sensor surface in contacting fashion, outputs relative coordinates representing the amount of movement. A touch panel is a device constructed by combining a display device such as a liquid crystal display with a touch pad. A fingerprint sensor is a device that acquires a fingerprint image by converting height variations on the finger skin surface, such as the ridges and valleys formed in the finger surface, into pixel values proportional to the distance between the sensor and the finger skin surface. There is also proposed a sensor that implements the function of a touch pad by using a fingerprint sensor.

SUMMARY

In a capacitive sensor, a body part placed in contact with or in close proximity to a sensor surface acts as an electrode opposing an electrode provided within the sensor. That is, a charge stored between the sensor electrode and the body part causes a change in capacitance. The capacitive sensor then detects this change in capacitance.

If residue such as skin tissue or sweat adhere to the sensor surface when the sensor surface is touched with the body part, or if moisture condenses on the sensor surface, since such foreign matter is also an electrical conductor, the capacitance between this electrical conductor and the sensor electrode also changes. As a result, the capacitive sensor can erroneously detect such skin tissue, sweat, or moisture as being a person's body part.

According to one embodiment, a capacitive sensor is provided. The capacitive sensor includes a plurality of electrodes each of which outputs an electrical signal corresponding to a capacitance determined by a distance between a surface of the capacitive sensor and an electrical conductor. The plurality of electrodes include electrodes having a first parasitic capacitance and electrodes having a second parasitic capacitance different from the first parasitic capacitance and are arranged in a prescribed pattern different than a pattern of biometric information of a body part to be read by the capacitive sensor.

According to another embodiment, a biometric image generating method using a capacitive sensor, the capacitive sensor including a plurality of electrodes each of which outputs an electrical signal corresponding to a capacitance determined by a distance between a surface of the sensor and an electrical conductor, wherein the plurality of electrodes include electrodes having a first parasitic capacitance and electrodes having a second parasitic capacitance different from the first parasitic capacitance and are arranged in a prescribed pattern different than a pattern of biometric information of a body part to be read is provided. The biometric image generating method includes: generating an image in which each of the plurality of electrodes corresponds to one pixel and each pixel has a pixel value proportional to an electrical signal output from a corresponding one of the plurality of electrodes; extracting from the generated image a foreground region which is a region that contains pixels at each of which an electrical conductor is located at a distance capable of forming a capacitor with a corresponding one of the plurality of electrodes; calculating correlation between the foreground region and a filter that matches the prescribed arrangement pattern, and thereby detecting a non-biometric region formed by a non-biometric electrical conductor left adhering to a sensor surface of the capacitive sensor; and calculating a metric that decreases as the area that the non-biometric region occupies in the foreground region increases, and outputting the image if the metric is higher than a predefined threshold value but discarding the image if the metric is not higher than the predefined threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 is a schematic cross-sectional side elevation view of the capacitive sensor according to the one embodiment.

FIG. 4A is a diagram schematically illustrating an image generated when a finger is placed on the surface of the sensor unit.

FIG. 4B is a diagram schematically illustrating an image generated after the finger has been removed from the surface of the sensor unit.

FIG. 5 is a functional block diagram of a processing unit in the capacitive sensor according to the one embodiment.

FIG. 6 is a diagram illustrating one example of a filter used for detecting a non-biometric region.

DESCRIPTION OF EMBODIMENTS

A capacitive sensor according to one embodiment, which is used as an area sensor for acquiring a biometric image representing biometric information, will be described below with reference to drawings.

In the capacitive sensor, a plurality of electrodes having different parasitic capacitances are arranged in a pattern different than the pattern of the biometric information to be detected. Then, by utilizing the fact that the change in capacitance that occurs when an electrical conductor other than a person's body part is present on the sensor surface is smaller than the change in capacitance that occurs when a person's body part is placed in contact with or in close proximity to the sensor surface, the capacitive sensor reproduces the distribution pattern of parasitic capacitances on the biometric image acquired by the sensor when an electrical conductor other than a person's body part is present on the sensor surface. The capacitive sensor determines whether the biometric image is to be discarded or to be output, depending on whether or not the distribution pattern of parasitic capacitances is detected on the biometric image.

In the present embodiment, the biometric information to be read is a fingerprint. However, a palm print may be used as the biometric information to be read.

Figure 1:
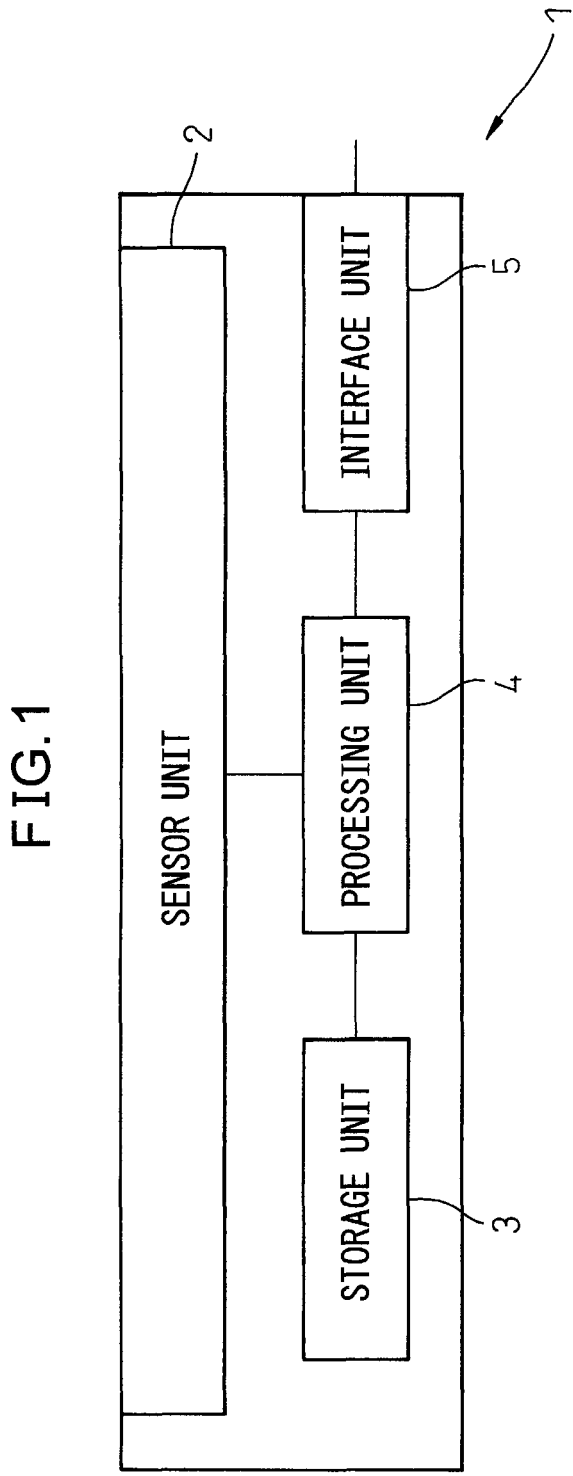
FIG. 1 is a diagram schematically illustrating the configuration of a capacitive sensor according to one embodiment.

FIG. 1 is a diagram schematically illustrating the configuration of the capacitive sensor. As illustrated in FIG. 1, the capacitive sensor 1 includes a sensor unit 2, a storage unit 3, a processing unit 4, and an interface unit 5. The capacitive sensor 1 generates, using the processing unit 4, a biometric image representing a two-dimensional distribution of the height variations on the surface of a user's finger placed in contact with or in close proximity to the sensor unit 2, and outputs the biometric image via the interface unit 5.

The sensor unit 2 is a two-dimensional sensor and outputs a change in capacitance occurring at each position on the sensor by converting the change into an electrical signal representing that position.

Figure 2:
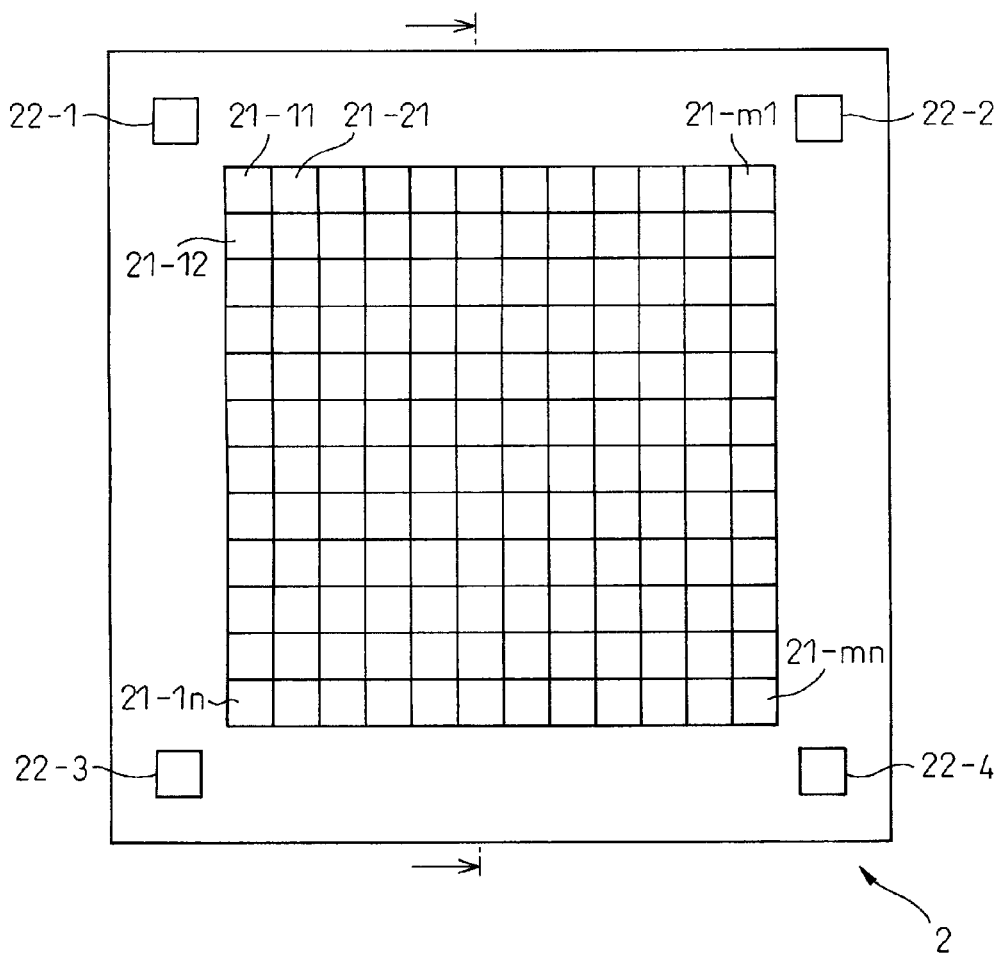
FIG. 2 is a schematic plan view of a sensor unit in the capacitive sensor.

FIG. 2 is a schematic plan view of the sensor unit 2. The sensor unit 2 includes an array of a plurality of electrodes 21-$ij$ formed by arranging m electrodes horizontally and n electrodes vertically in a two-dimensional array (where $1 \leq i \leq m$, $1 \leq i \leq n$, and m and n are each an integer not smaller than 2). The electrodes 21-$ij$ are each constructed from an electrical conductor, such as copper or gold, formed in a square shape. Preferably, the width of each electrode is smaller than the average width of a fingerprint ridge, and is set, for example, equal to 0.1 mm. When an electrical conductor such as a finger is placed on the surface of the sensor unit 2, each electrode 21-$ij$ forms a capacitor between it and the electrical conductor. The capacitor has a capacitance proportional to the distance between the electrode 21-$ij$ and the electrical conductor, and a charge proportional to the capacitance is stored on the electrode 21-$ij$. Then, the electrical signal corresponding to the capacitance is read out of the electrode 21-$ij$ and, after the electrical signal is amplified by an op-amp (not depicted), the signal is converted by an analog-digital converter (not depicted) into a digital signal which is supplied to the processing unit 4.

Reference electrodes 22-1 to 22-4 for providing a reference potential to the finger placed in contact with or in close proximity to the sensor unit 2 are respectively arranged at the four corners of the sensor unit 2. The reference electrodes 22-1 to 22-4 are connected to a power supply not depicted.

FIG. 3 is a schematic cross-sectional side elevation view of the sensor unit 2 taken along line indicated by reference characters AA' in FIG. 2. The surface of each electrode 21-$ij$ is covered with a protective layer 23 formed from an insulating material such as glass or a resin. The surface 24 of the protective layer 23 is treated with a water repellent coating.

The electrodes 21-$ij$ are arranged on a substrate 25 formed from an insulating material such as a resin. The substrate 25 is formed such that the surface of the substrate 25 where the odd-numbered rows of the electrode array are formed is higher than the surface thereof where the even-numbered rows are formed. As a result, the distance from the surface 24 of the sensor unit 2 to each of the electrodes 21-$i(2k-1)$ ($k=1, 2, \ldots, n/2$) arranged in the odd-numbered rows is smaller than the distance from the surface 24 of the sensor unit 2 to each of the electrodes 21-$i(2k)$ arranged in the even-numbered rows. Accordingly, the parasitic capacitance $C_{c1}$ that occurs between the surface 24 of the sensor unit 2 and each of the electrodes 21-$i(2k-1)$ arranged in the odd-numbered rows is larger than the parasitic capacitance $C_{c0}$ that occurs between the surface 24 of the sensor unit 2 and each of the electrodes 21-$i(2k)$ arranged in the even-numbered rows.

To facilitate understanding of the operation of the capacitive sensor 1 according to the present embodiment, a description will be given below of the difference between the capacitance detected at each electrode when the finger is placed on the sensor unit 2 and the capacitance detected when an electrical conductor other than a person's body part is present on the surface 24 of the sensor unit 2.

The capacitance $C_{total}$ between the electrode 21-$ij$ and the finger or other electrical conductor placed on the surface of the sensor unit 2 is calculated by the following equation.

$$C_{total} = C_f + C_p \quad (1)$$

where $C_f$ represents the capacitance between the conductor and the electrode 21-$ij$, and $C_p$ the parasitic capacitance of the electrode 21-$ij$. The protective layer 23 is interposed between the electrode 21-$ij$ and the electrical conductor placed on the surface of the sensor unit 2. As a result, the capacitor formed between the conductor and the electrode 21-$ij$ is equivalent to a series connection of two capacitors, one formed between the conductor and the surface 24 of the sensor unit 2 and the other between the surface 24 of the sensor unit 2 and the electrode 21-$ij$. As a result, the capacitance $C_f$ is expressed by the following equation.

$$1/C_f = 1/C_0 + 1/C_c \quad (2)$$

where $C_0$ represents the capacitance between the conductor and the surface 24 of the sensor unit 2, and $C_c$ the capacitance between the surface 24 of the sensor unit 2 and the electrode 21-$ij$.

From the above equations (1) and (2), the capacitance $C_{total}$ between the conductor and the electrode 21-$ij$ can be expressed as:

$$C_{total} = C_0 C_c / (C_0 + C_c) + C_p \quad (3)$$

Let the distance between the conductor and the surface 24 of the sensor unit 2 be denoted by $d_0$, the thickness of the protective layer 23 by $d_c$, the permittivity of vacuum by $\epsilon_0$, the permittivity of the protective layer 23 by $\epsilon_c$, and the area of the electrode by A; then, the capacitance $C_{total}$ is expressed as:

$$C_{total} = \epsilon_0 \epsilon_c A / (d_c \epsilon_0 + d_0 \epsilon_c) + C_p \quad (4)$$

If the parasitic capacitance $C_p$ is sufficiently small, then when the area of the electrical conductor placed opposite the electrode 21-$ij$ is equal to or larger than the area of the electrode 21-$ij$, the second term in equation (4) can be ignored. As a result, when the finger larger than the electrode 21-$ij$ is placed on the surface 24 of the sensor unit 2, the capacitance $C_{total}$ between the surface of the finger and the electrode 21-$ij$ increases as the distance $d_o$ between the surface of the finger and the surface 24 of the sensor unit 2 decreases. Accordingly, the capacitive sensor 1 can generate a biometric image having pixel values proportional to the height variations on the surface of the finger.

However, since the surface 24 of the protective layer 23 is treated with a water repellent coating, any residue such as sweat or skin tissue is turned into a tiny droplet on the surface 24, and the area of such residue becomes much smaller than that of the electrode 21-$ij$. Therefore, the above equation (4) can be rewritten as:

$$C_{total} = \varepsilon_c A' / d_c + C_p \quad (5)$$
$$A'' \ll A$$

where A' represents the area of the electrical conductor adhering to the surface 24 of the sensor unit 24 at a position opposite the electrode 21-$ij$. In equation (5), since the electrical conductor is adhering to the surface 24 of the sensor unit 2, $d_0=0$.

In equation (5), the second term is not negligible, and the capacitance $C_{total}$ varies with the parasitic capacitance $C_p$. Further, the parasitic capacitance of each electrode 21-$ij$ varies with the distance between the electrode and the surface 24 of the sensor unit 2. The distance between the electrode 21-$ij$ and the surface 24 of the sensor unit 2 varies according to the position of the electrode.

Accordingly, if tiny skin tissue or water vapor are present all over the surface of the sensor unit 2, an arrangement pattern of electrodes having two kinds of parasitic capacitances is formed on the image.

In the present embodiment, the electrode arrangement pattern is different from the fingerprint ridge pattern. As a result, it can be easily identified whether the pattern produced on the image is due to the fingerprint ridges or the electrode arrangement pattern. Furthermore, since the size of each individual electrode is smaller than the average ridge width, the resolution of the electrode arrangement pattern is higher than the resolution of the fingerprint pattern. As a result, even when water vapor or the like adhere along the fingerprint ridges placed in contact with the surface of the sensor unit 2, the electrode arrangement pattern is observable on the biometric image.

FIG. 4A is a diagram schematically illustrating the biometric image generated when the finger is placed on the surface 24 of the sensor unit 2, and FIG. 4B is a diagram schematically illustrating the biometric image generated after the finger has been removed from the surface 24 of the sensor unit 2. For convenience of explanation, it is to be understood that, in the biometric images illustrated in FIGS. 4A and 4B, darker pixels have higher pixel values, i.e., the pixels are darker as the capacitance detected at the corresponding electrode is larger.

In the biometric image 400 of FIG. 4A, each black line 401 indicates a fingerprint ridge. When the finger is placed on the surface 24 of the sensor unit 2, the capacitance $C_{total}$ is not affected by the parasitic capacitance of each electrode, but varies with the distance between the surface of the finger and the surface 24 of the sensor unit 2, as earlier described. As a result, in the biometric image 400, the portion corresponding to each fingerprint ridge 401 appears black, while the other portion appears white.

On the other hand, when the finger is removed from the sensor unit 2 after generating the biometric image 400 of FIG. 4A, residues such as tiny skin tissue flakes or sweat are left adhering to the surface 24 of the sensor unit 2 along the ridges. Further, since the size of the adhering skin tissue or sweat is small, the capacitance of each electrode varies with the parasitic capacitance of the electrode, as earlier described. This results in the formation of a biometric image 410 in which the arrangement pattern of the electrodes having different parasitic capacitances is superimposed on the ridge pattern, as illustrated in FIG. 4B. In the present embodiment, the electrodes 21-$ij$ arranged in every other row have the same parasitic capacitance. As a result, a pattern 411 with a horizontally striped pattern superimposed on the ridge pattern is produced on the biometric image 410.

The storage unit 3 includes, for example, a semiconductor memory. The storage unit 3 stores a program and various kinds of data used in the processing unit 4 of the capacitive sensor 1. The storage unit 3 also stores the biometric image generated by the processing unit 4 temporarily until the biometric image is output via the interface unit 5 or is discarded.

The processing unit 4 includes one or a plurality of processors and their peripheral circuitry. Then, based on the electrical signals read out of the electrodes of the sensor unit 2, the processing unit 4 creates a biometric image representing the user's fingerprint.

Further, the processing unit 4 evaluates the quality of the biometric image by checking the biometric image to see whether or not the electrode arrangement pattern is observed on the biometric image. If the quality of the generated biometric image is good, the processing unit 4 supplies the biometric image to other apparatus (not depicted) connected via the interface unit 5. On the other hand, if the quality of the generated biometric image is not good, the processing unit 4 discards the biometric image. In this case, the processing unit 4 passes a message directing the reacquisition of the fingerprint to other apparatus connected via the interface unit 5.

The interface unit 5 includes an interface circuit for connecting the capacitive sensor 1 to other apparatus. The interface unit 5 supplies the biometric image or message received from the processing unit 4 to the apparatus connected to the capacitive sensor 1.

FIG. 5 is a functional block diagram of the processing unit 4. The processing unit 4 includes an image generating unit 41, a foreground region extracting unit 42, a non-biometric region detecting unit 43, and a quality judging unit 44. These units constituting the processing unit 4 are functional modules implemented by executing a computer program on the processor of the processing unit 4. Alternatively, these units constituting the processing unit 4 may be implemented as firmware on the capacitive sensor 1.

The image generating unit 41 arranges the electrical signals read out of the electrodes 21-$ij$ of the sensor unit 2 into a two-dimensional array in accordance with the arrangement pattern of the electrodes, and converts the electrical signals of the electrodes into corresponding pixel values thereby generating a biometric image representing the biometric information captured by the sensor unit 2. The image generating unit 41 passes the generated biometric image to the foreground region extracting unit 42 and the non-biometric region detecting unit 43. Further, the image generating unit 41 stores the generated biometric image in the storage unit 3.

The foreground region extracting unit 42 extracts, from the biometric image generated by the image generating unit 41, a foreground region which is a region where an electrical conductor such as a person's body part or his skin tissue or sweat was in contact with or in close proximity to the surface 24 of the sensor unit 2 and was forming capacitors with the corresponding electrodes as the counter electrodes. In the present embodiment, it is assumed that the pixel value corresponding to each electrode in the sensor unit 2 becomes larger as the distance between the conductor and the electrode decreases. Alternatively, the image generating unit 41 may generate the biometric image so that the pixel value corresponding to each electrode in the sensor unit 2 becomes smaller as the distance between the conductor and the electrode decreases. In the latter case, the sense of the inequality relating to the pixel value is opposite from that given in the following description.

In the foreground region, the pixel value variation is relatively large, because the pixels in the foreground region have values proportional to the height variations on the surface of the finger. On the other hand, in the background region, since there are no electrically conductive parts that form pairs with the electrodes corresponding to the pixels, and there are therefore no electrodes that form capacitors, the values of the pixels are uniform and are very small. In view of this, the foreground region extracting unit 42 determines a threshold value by reference to which each pixel in the biometric image is classified into the foreground region or the background region, based on the pixel value itself and the pixel value variation. For this purpose, the foreground region extracting unit 42 divides the biometric image into a plurality of sub-regions. Preferably, the width and height of each sub-region are chosen to be, for example, equal to several times the average ridge pitch so that each single sub-region will contain several ridges.

Next, for each sub-region, the foreground region extracting unit 42 calculates the standard deviation or the variance of the pixel values contained in the sub-region. The foreground region extracting unit 42 further calculates a standard deviation $\sigma'$ having the standard deviation or variance for each sub-region as a variable. The foreground region extracting unit 42 determines a threshold value $T_\sigma$ for the pixel value variation by multiplying the standard deviation $\sigma'$ by a given coefficient $C_\sigma$. The given coefficient $C_\sigma$ is determined in advance, for example, by experiment.

Further, the foreground region extracting unit 42 determines a threshold value $T_\mu$ for the pixel value by adding a given offset value $C_\mu$ to an average pixel value $\Sigma\mu$ taken over all the pixels in the biometric image. The given offset value $C_\mu$ is determined in advance, for example, by experiment. Alternatively, the foreground region extracting unit 42 may determine the threshold value $T_\mu$ by obtaining a histogram of the pixel values taken over the entire biometric image and by performing discriminant analysis on the histogram.

The foreground region extracting unit 42 calculates the standard deviation $\sigma$ and the average value $\mu$ of the pixel values for each sub-region. The foreground region extracting unit 42 determines that a sub-region that satisfies one or the other of the following conditions belongs to the foreground region.

$$\sigma > T_\sigma \text{ or } \mu > T_\mu \tag{6}$$

Alternatively, the foreground region extracting unit 42 may determine that only a sub-region that satisfies both of the above conditions belongs to the foreground region.

Further, before determining the threshold values $T_\sigma$ and $T_\mu$, the foreground region extracting unit 42 may apply preprocessing, such as noise elimination using a Gaussian filter, contrast correction, or grayscale conversion, to the entire biometric image.

The foreground region extracting unit 42 passes information representing the foreground region to the non-biometric region detecting unit 43. The information representing the foreground region may be, for example, a binary image in which the pixels contained in the foreground region and the pixels contained in the background region have different values. Alternatively, the information representing the foreground region may be the coordinates representing the position of any one of the corners or the centroid of each sub-region extracted as the foreground region.

The non-biometric region detecting unit 43 detects a non-biometric region by detecting from the foreground region a region corresponding to a portion where an electrical conductor other than a person's body part was present on the surface 24 of the sensor unit 2. The larger the size of the non-biometric region contained in the foreground region, the lower the quality of the biometric image, because the biometric image then carries more information that is different from the originally intended biometric information. Accordingly, the size of the non-biometric region serves as a metric for determining the quality of the biometric image.

Further, in the non-biometric region, the parasitic capacitance of each electrode can become substantial relative to the capacitance between the conductor and the electrode, as earlier described. As a result, the pixels contained in the non-biometric region have pixel values corresponding to the arrangement pattern of the electrodes having different parasitic capacitances.

Then, using a filter that matches the arrangement pattern of the electrodes having different parasitic capacitances, the non-biometric region detecting unit 43 calculates the correlation between the foreground region and the filter in accordance with the following equation.

$$I'(i, j) = \sum_{k,l} \{I(i+k, j+l) \times F(k, l)\} \tag{7}$$

where $I'(i,j)$ indicates the correlation value for a given pixel $(i,j)$, and $I(i+k,j+l)$ represents the pixel value of the pixel $(i+k,j+l)$ contained in the foreground region. On the other hand, $F(k,l)$ represents the pixel value at coordinates $(k,l)$ on the filter.

FIG. 6 illustrates one example of the filter used for detecting the non-biometric region. The filter 600 has three pixels horizontally and five pixels vertically. In the present embodiment, electrodes having high parasitic capacitance alternate with electrodes having low parasitic capacitance from one row to another. As a result, in the filter 600, each pixel in an odd-numbered row has a value of $w_0$, while each pixel in an even-numbered row has a value of $-3w_0/2$. For example, $w_0$ is set to 1 or $1/15$.

The non-biometric region detecting unit 43 calculates the correlation value for each pixel contained in the foreground region. Then, the non-biometric region detecting unit 43 determines that any pixel whose correlation value in terms of absolute value exceeds a predefined threshold value is a pixel contained in the non-biometric region. The predefined threshold value is determined in advance by experiment, and is set, for example, equal to one quarter of the sum of the absolute values of the pixels in the filter.

The non-biometric region detecting unit 43 obtains the total number, $N_f$, of pixels contained in the foreground region and the total number, $N_n$, of pixels contained in the non-biometric region detected from the foreground region. The non-biometric region detecting unit 43 passes $N_f$ and $N_n$ to the quality judging unit 44.

The quality judging unit 44 evaluates the quality of the biometric image created by the biometric image generating unit 41. For this purpose, the quality judging unit 44 calculates a quality metric Q based on the total number, $N_f$, of pixels contained in the foreground region and the total number, $N_n$, of pixels contained in the non-biometric region detected from the foreground region.

The quality metric Q is calculated, for example, in accordance with the following equation.

$$Q = \frac{N_f - N_n}{N_f} \quad (8)$$

In equation (8), $N_n$ can take any value between 0 to $N_f$. Accordingly, the quality metric Q is represented by a value in the range of 0 to 1. The larger the value of $N_n$, the larger the size of the non-biometric region contained in the foreground region, and thus the lower the quality metric Q.

The quality judging unit 44 compares the quality metric Q with a quality threshold value $T_q$. If the quality metric Q is lower than the quality threshold value $T_q$, the quality judging unit 44 judges that the biometric image is defective. On the other hand, if the quality metric Q is equal to or higher than the quality threshold value $T_q$, the quality judging unit 44 judges that the quality of the biometric image is good.

Further, if the total number, $N_f$, of pixels contained in the foreground region is smaller than a predefined area threshold value $T_s$, the quality judging unit 44 may also judge that the biometric image is defective.

The quality threshold value $T_q$ and the area threshold value $T_s$ are both set based on how the biometric image acquired by the capacitive sensor 1 is used. For example, in applications where the biometric image acquired by the capacitive sensor 1 is used for biometric authentication, the presence of a non-biometric region in the biometric image will increase the chance of failing the biometric authentication. It is also necessary that the biometric region be large enough that the biometric authentication can reliably detect the characteristic features of the fingerprint. In view of this, the quality threshold value $T_q$ is set, for example, to 0.9, and the area threshold value $T_s$ is set, for example, equal to one half of the total number of pixels in the biometric image.

The quality judging unit 44 passes the result of the biometric image quality judgment to the processing unit 4. If the result of the judgment indicates that the quality of the biometric image is good, the processing unit 4 retrieves the biometric image from the storage unit 3 and supplies the biometric image to another apparatus connected via the interface unit 5. On the other hand, if the image is judged by the quality judging unit 44 to be defective, the biometric image stored in the storage unit 3 is discarded. Then, the processing unit 4 passes a message directing the reacquisition of the fingerprint and a message indicating that the sensor surface may be soiled to other apparatus connected via the interface unit 5.

If the capacitive sensor 1 is equipped with a display unit such as a liquid crystal display (not depicted), the processing unit 4 may notify the user via the display unit that the acquisition of the biometric information has failed and that the sensor surface may be soiled.

Figure 7:
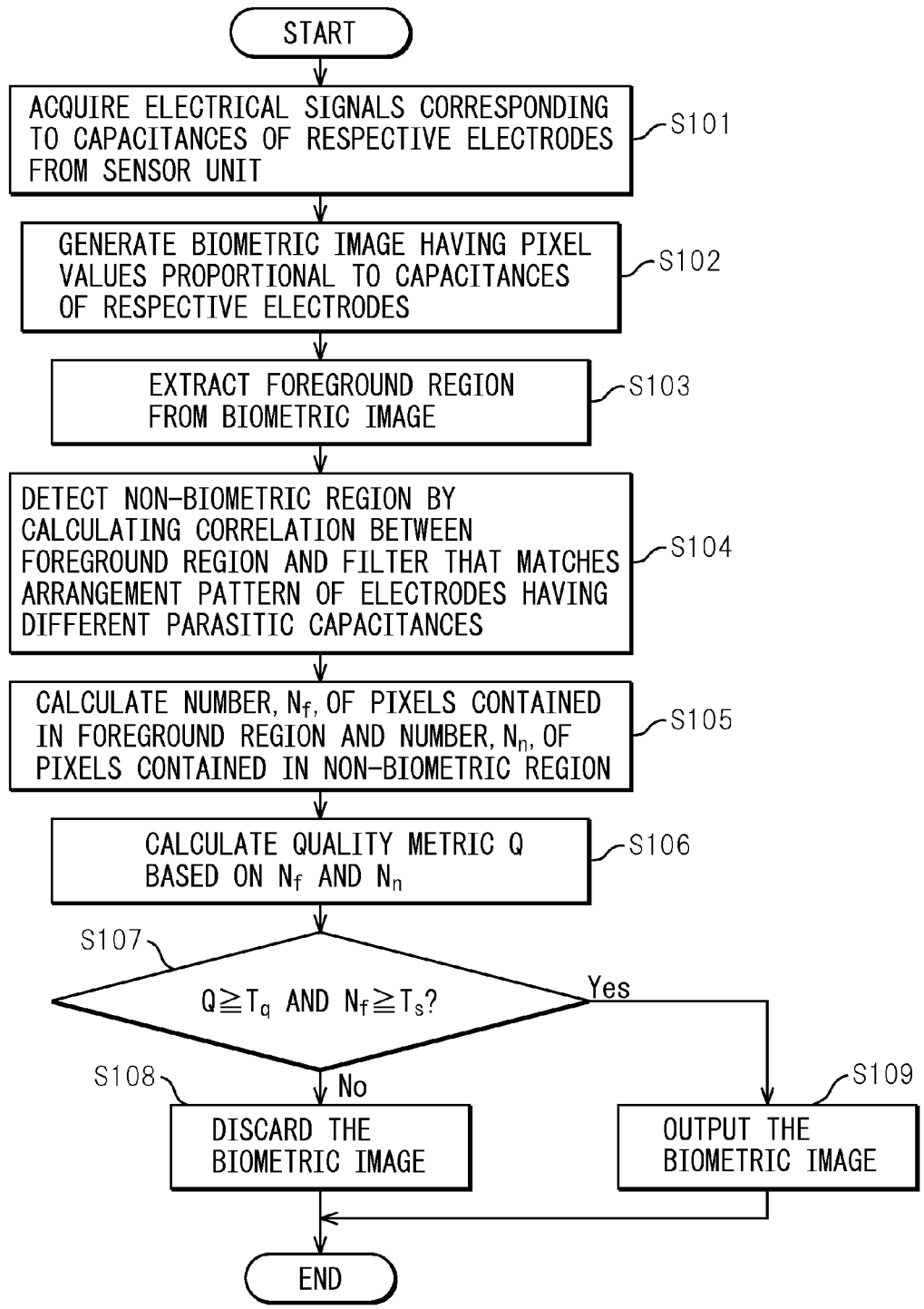
FIG. 7 is a diagram illustrating an operation flowchart of a biometric image generation process.

FIG. 7 is a diagram illustrating an operation flowchart of a biometric image generation process which is performed under the control of the processing unit 4.

The processing unit 4 acquires from the sensor unit 2 electrical signals corresponding to the capacitances of the respective electrodes 21-$ij$ (step S101). The image generating unit 41 in the processing unit 4 generates a biometric image having pixel values proportional to the capacitances of the respective electrodes (step S102). The image generating unit 41 passes the generated biometric image to the foreground region extracting unit 42 and the non-biometric region detecting unit 43 in the processing unit 4. Further, the image generating unit 41 stores the biometric image in the storage unit 3.

The foreground region extracting unit 42 extracts a foreground region from the biometric image (step S103). Then, the foreground region extracting unit 42 passes information representing the foreground region to the non-biometric region detecting unit 43.

The non-biometric region detecting unit 43 detects a non-biometric region by calculating the correlation between the foreground region extracted from the biometric image and a filter that matches the arrangement pattern of the electrodes having different parasitic capacitances (step S104). Then, the non-biometric region detecting unit 43 calculates the number, $N_f$, of pixels contained in the foreground region and the number, $N_n$, of pixels contained in the non-biometric region (step S105). The non-biometric region detecting unit 43 passes $N_f$ and $N_n$ to the quality judging unit 44 in the processing unit 4.

The quality judging unit 44 calculates the quality metric Q based on $N_f$ and $N_n$ (step S106). Then, the quality judging unit 44 judges whether or not the quality metric Q is equal to or higher than the quality threshold value $T_q$ and, at the same time, the number, $N_f$, of pixels contained in the foreground region is equal to or larger than $T_s$ (step S107).

If the quality metric Q is less than the quality threshold value $T_q$ or if the number, $N_f$, of pixels contained in the foreground region is less than $T_s$ (No in step S107), the quality judging unit 44 judges that the biometric image is defective. The quality judging unit 44 passes the result of the judgment to the processing unit 4. The processing unit 4 discards the biometric image (step S108). Further, the processing unit 4 passes the message directing the reacquisition of the fingerprint and the message indicating that the sensor surface may be soiled to another apparatus connected via the interface unit 5.

On the other hand, if the quality metric Q is equal to or higher than the quality threshold value $T_q$ and if the number, $N_f$, of pixels contained in the foreground region is equal to or larger than $T_s$ (Yes in step S107), the quality judging unit 44 judges that the quality of the biometric image is good. The processing unit 4 supplies the biometric image to other apparatus connected via the interface unit 5 (step S109). After step S108 or S109, the processing unit 4 terminates the biometric image generation process.

As has been described above, in the capacitive sensor according to the one embodiment, electrodes having different parasitic capacitances are arranged in a pattern different than the pattern of the biometric information to be acquired. Accordingly, in this capacitive sensor, when an electrical conductor other than a person's body part is present on the sensor surface, an arrangement pattern of the electrodes having the same parasitic capacitance appears on the generated biometric image. Then, by detecting the arrangement pattern of the electrodes having different parasitic capacitances, the capacitive sensor can detect that the image is defective because an electrical conductor other than a person's body part is present on the sensor surface. Accordingly, if the biometric image is generated by erroneously detecting residues such as skin tissue flakes or sweat adhering to the sensor surface as being the biometric information, the capacitive sensor can prevent such a biometric image from being output.

The arrangement pattern of the electrodes having different parasitic capacitances is not limited to that illustrated in the above embodiment. The arrangement pattern of the electrodes having different parasitic capacitances need only be different from the pattern of the biometric information to be acquired. For example, if the biometric information to be acquired is a fingerprint, the electrodes having different parasitic capacitances may be arranged in a checkerboard pattern. Alternatively, the electrodes having different parasitic capacitances may be arranged in a vertically striped pattern. Further, the electrodes having different parasitic capacitances may be arranged in a random pattern. Furthermore, in the sensor unit, a plurality of electrodes having three or more different parasitic capacitances may be arranged in a pattern different than the pattern of the biometric information to be acquired.

In any case, the non-biometric region can be detected by calculating the correlation between the foreground region extracted from the biometric image and the filter having the same pattern as the arrangement pattern of the electrodes having different parasitic capacitances.

The structure of the sensor unit also is not limited to that illustrated in the above embodiment.

Figure 8:
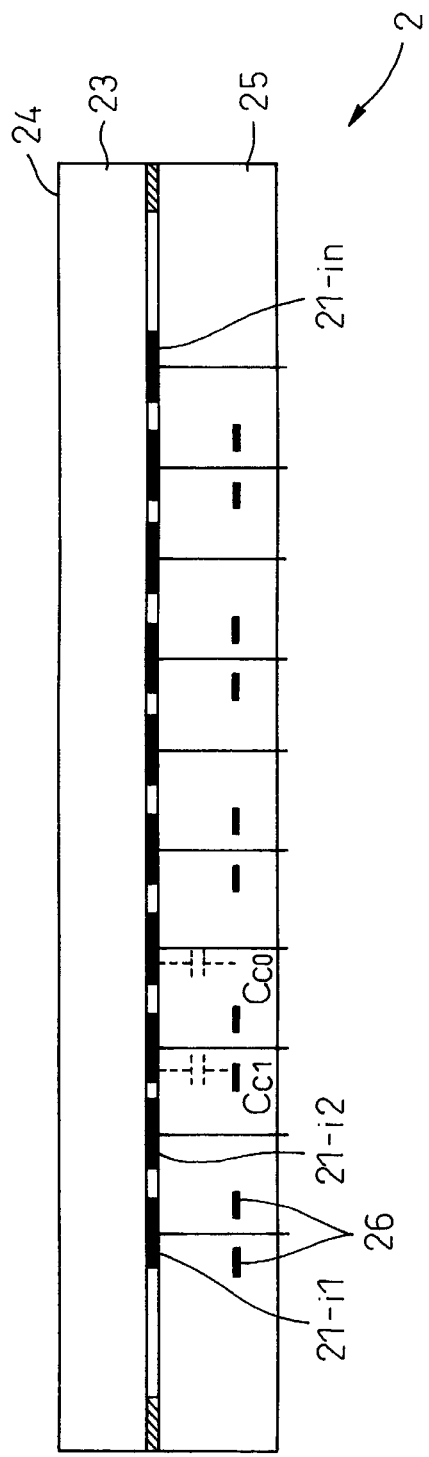
FIG. 8 is a schematic cross-sectional side elevation view of a capacitive sensor according to an alternative embodiment.

FIG. 8 is a schematic cross-sectional side elevation view of a sensor unit according to an alternative embodiment in which the electrodes are formed in such a manner that the parasitic capacitance differs from one electrode to another. In FIG. 8, the electrodes 21-$ij$ are placed on the substrate 25 such that the distance from the surface 24 of the protective layer 23 to any of the electrodes 21-$ij$ is equal. However, in the substrate 25, an electrical conductor 26 is embedded below each of the electrodes 21-$i$(2k−1) (k=1, 2, . . . , n/2) arranged in the odd-numbered rows, so that a capacitor is formed between the electrical conductor 26 and the electrode 21-$i$(2k−1). As a result, the parasitic capacitance $C_{c1}$ that occurs between the surface of the protective layer 23 and each of the electrodes 21-$i$(2k−1) arranged in the odd-numbered rows differs from the parasitic capacitance $C_{c0}$ that occurs between the surface of the protective layer 23 and each of the electrodes 21-$i$(2k) arranged in the even-numbered rows.

The non-biometric region detecting unit in the processing unit may detect the non-biometric region from the entire biometric image by calculating the correlation between the entire biometric image and the filter that matches the electrode arrangement pattern. In this case, the quality judging unit in the processing unit calculates the quality metric Q, for example, by subtracting the total number, $N_n$, of pixels contained in the non-biometric region from the total number, N, of pixels contained in the entire biometric image, and by dividing the difference (N−$N_n$) by N. Then, if the calculated quality metric Q (=(N−$N_n$)/N) is equal to or lower than a predefined threshold value, the quality judging unit may determine that the biometric image is defective. The processing unit can thus discard the biometric image if the biometric image is such that, because of the presence of residues such as skin tissue flakes or sweat over the entire surface of the sensor unit, the electrode arrangement pattern is captured over a wide area within the region not touched with a person's body part.

The capacitive sensor can be used in a variety of applications. For example, the capacitive sensor may be used as a biometric authentication device. In this case, the storage unit in the capacitive sensor stores identification information of each preregistered user by associating it with a registered biometric image created by capturing an image of the user's biometric information. Then, the processing unit performs pattern matching between the biometric image judged by the quality judging unit to be good and the registered biometric image. Alternatively, the processing unit may extract feature points from the biometric image judged by the quality judging unit to be good and the registered biometric image, respectively, and may perform matching (minutiae matching) between these feature points. Then, if the degree of similarity computed by performing the pattern matching or minutiae matching is equal to or greater than a predefined threshold value, the processing unit authenticates the user as being the registered user corresponding to the registered biometric information. The processing unit transmits a signal indicating the successful authentication and the identification information of the registered user to other apparatus connected via the interface unit.

The capacitive sensor may be used as a touch sensor. In this case, the processing unit need only be able to accurately detect whether or not the sensor unit of the capacitive sensor has been touched with a finger. Accordingly, the quality threshold value $T_q$ and the area threshold value $T_s$ to be used in the quality judging unit of the processing unit are set lower than the corresponding threshold values used when the biometric image is used for biometric authentication. For example, the quality threshold value $T_q$ is set to 0.5, and the area threshold value $T_s$ is set equal to one tenth of the total number of pixels in the biometric image. Then, if the quality of the biometric image is judged good, the processing unit transmits a signal indicating that the capacitive sensor has been touched to other apparatus connected via the interface unit.

The capacitive sensor may also be used as a touch pad or a touch panel. In this case, the capacitive sensor senses the position at which the sensor surface is pressed. For this purpose, if the quality of the biometric image is judged good, the processing unit obtains the coordinates of the centroid of the pixels not contained in the non-biometric region but contained in the foreground region defined on the biometric image. Then, the processing unit supplies the coordinates of the centroid as the coordinates of the pressed position to other apparatus connected via the interface unit.

According to another alternative embodiment, the capacitive sensor may be a swipe-type sensor that is designed to read a fingerprint larger than the sensor area by letting a person move his finger across the sensor area. In this case also, the capacitive sensor may have the same configuration as that illustrated in FIG. 1. In the present embodiment, the direction in which the body part such as a finger is slidingly moved is taken as the vertical direction, and the direction at right angles to the direction in which the body part is slidingly moved is taken as the horizontal direction.

Figure 9:
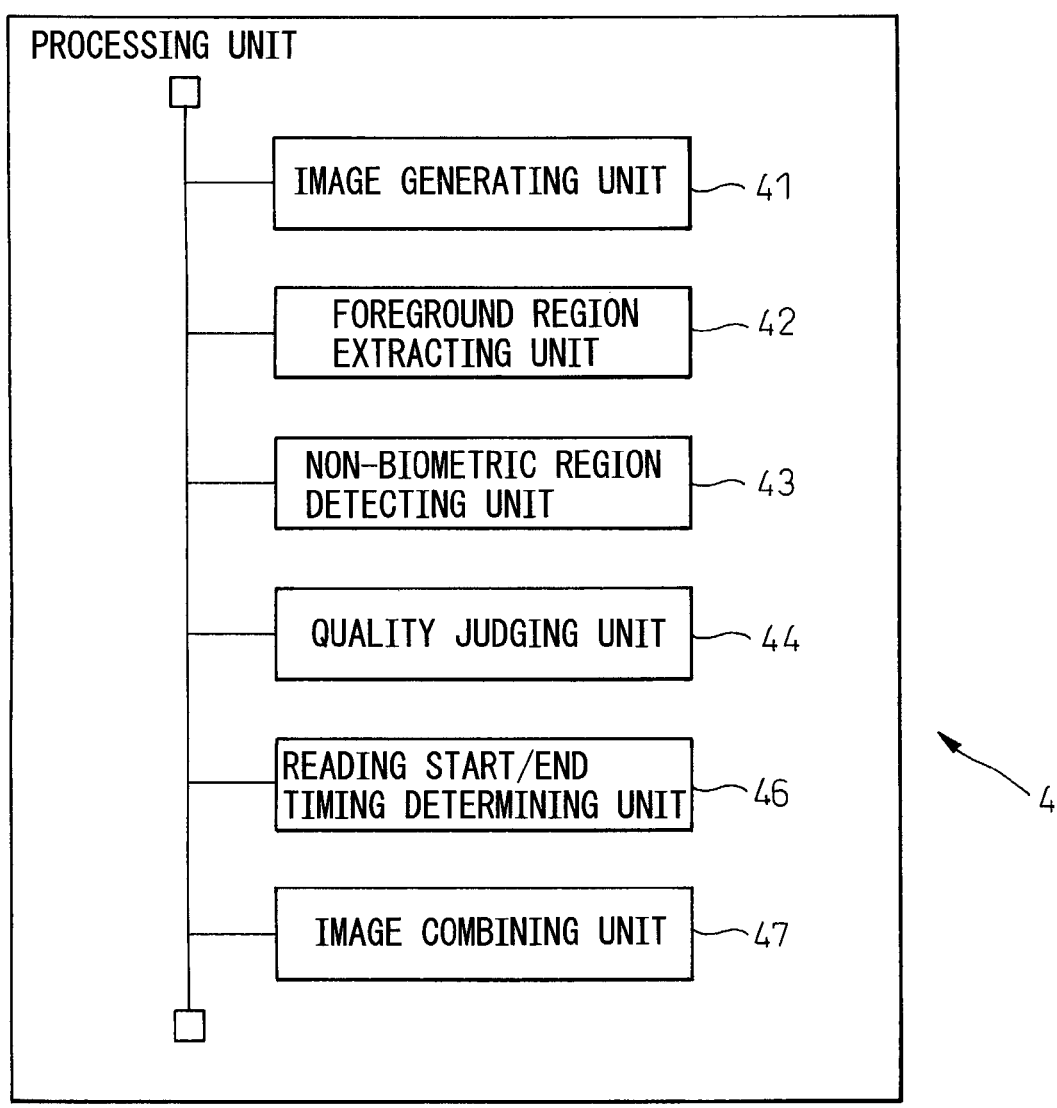
FIG. 9 is a functional block diagram of a processing unit in a swipe-type capacitive sensor according to another alternative embodiment.

FIG. 9 is a functional block diagram of the processing unit 4. The processing unit 4 includes an image generating unit 41, a foreground region extracting unit 42, a non-biometric region detecting unit 43, a quality judging unit 44, a reading start/end timing determining unit 46, and an image combining unit 47. In FIG. 9, the functional blocks of the processing unit 4 corresponding to those of the processing unit 4 illustrated in FIG. 5 are respectively designated by the same reference numerals.

The following describes the differences from the processing unit 4 illustrated in FIG. 5.

The image generating unit 41 sequentially generates, at prescribed read time intervals, sub-images in which each electrode corresponds to one pixel and each pixel has a pixel value proportional to the signal read out of the corresponding electrode. The image generating unit 41 passes each sub-image to the foreground region extracting unit 42, the non-biometric region detecting unit 43, the reading start/end timing determining unit 46, and the image combining unit 47. For example, when the sensor unit 2 has a plurality of electrodes arranged in a line along the horizontal direction, the sub-image is an image of a single line extending in the horizontal direction. On the other hand, when the sensor unit 2 has a plurality of electrodes arranged in a two-dimensional array, for example, the sub-image is a two-dimensional image having a size corresponding to the size of the two-dimensional array.

The foreground region extracting unit 42 extracts a foreground region from each sub-image. Then, the foreground region extracting unit 42 passes information representing the foreground region to the non-biometric region detecting unit 43.

The non-biometric region detecting unit 43 detects a non-biometric region from the foreground region of each sub-image. The non-biometric region detecting unit 43 calculates, for each sub-image, the number of pixels contained in the foreground region and the number of pixels contained in the non-biometric region, and passes the calculated numbers to the reading start/end timing determining unit 46 together with the information representing the corresponding sub-image.

The foreground region extracting unit 42 and the non-biometric region detecting unit 43 can extract the foreground region and the non-biometric region, respectively, by performing the same processing as that performed by the foreground region extracting unit 42 and the non-biometric region detecting unit 43 in the processing unit 4 illustrated in FIG. 5. For example, when the electrodes having relatively high parasitic capacitance and the electrodes having relatively low parasitic capacitance are arranged alternately along the horizontal direction, the filter for detecting the non-biometric region has a shape generated, for example, by rotating one row in the filter 600 of FIG. 6 through 90° and arranging the pixels in the horizontal direction.

The reading start/end timing determining unit 46 determines the timing for starting the reading of the biometric information and the timing for ending the reading of the biometric information. The reading start timing refers to the timing for acquiring the first sub-image to be used to create the biometric image carrying the biometric information, and the reading end timing refers to the timing for acquiring the last sub-image to be used to create the biometric image. It is therefore to be noted that the capacitive sensor acquires sub-images by the sensor unit 2 even before the reading start timing or even after the reading end timing.

In the case of the swipe-type sensor, when a person's body part such as a finger is brought in close proximity to the sensor at the time of starting the reading of the biometric information, water vapor, etc., are generated by the vaporization of sweat from the body part, and a pattern corresponding to a stain or a fingerprint previously left on the sensor surface appears on the sub-image, even if the body part is not in contact with the sensor surface. On the other hand, at the time of ending the reading of the biometric information, since the sweat from the body part is rubbed against the sensor surface, the sweat adheres to the sensor surface. As a result, even after the body part is removed from the sensor, a pattern corresponding to a stain or a fingerprint left thereon appears on the sub-image.

If the timing for starting the reading of the biometric information and the timing for ending the reading of the biometric information are not determined properly, a region representing other information than the originally intended biometric information may occupy a large area in the biometric image representing the biometric information. If such a biometric image is used for matching, the accuracy of matching may degrade.

Accordingly, the reading start/end timing determining unit 46 determines the biometric information reading start timing and the biometric information reading end timing so that the region representing the stain, etc., left adhering to the sensor surface does not occupy a large area in the biometric image.

The reading start/end timing determining unit 46 calculates the quality metric Q for each sub-image in accordance with the previously given equation (8). The reading start/end timing determining unit 46 then compares the quality metric Q with a predefined reading start threshold value. The reading start/end timing determining unit 46 determines that the time of acquisition of the sub-image whose quality metric Q first exceeded the reading start threshold value represents the reading start timing. Further, the reading start/end timing determining unit 46 determines that the time of acquisition of the sub-image whose quality metric Q first dropped below a predefined reading end threshold value, among the sub-images acquired after the reading start timing, represents the reading end timing.

The reading start/end timing determining unit 46 notifies the processing unit 4 of the reading start timing and the reading end timing. When notified of the reading start timing, the processing unit 4 temporarily stores any subsequently acquired sub-image in the storage unit 3. The processing unit 4 discards any sub-image acquired before the notification of the reading start timing. When notified of the reading end timing, the processing unit 4 passes the sub-images acquired before the notification of the reading end timing and stored in the storage unit 3 to the image combining unit 47.

It is preferable to set the reading start threshold value lower than the reading end threshold value. When the user is not used to or too used to getting his biometric information read by the capacitive sensor, the user tends to slidingly move his designated body part across the sensor before the body part is actually brought into close contact with the sensor. As a result, if the capacitive sensor starts reading the biometric information after making sure that the body part has been brought into close contact with the sensor, a portion of the body part may not be captured by the sensor. In particular, when the moving speed of the body part is fast, the body part will have moved some distance along the sensor surface by the time it is determined that the body part has been brought into close contact with the sensor, and the feature points of the biometric information useful for matching may not be captured within the effective reading range. In view of this, the reading start threshold value is set, for example, to about 0.3 to 0.5.

The reading start/end timing determining unit 46 may determine the reading start timing based on the width of the body part contacting the sensor, instead of or in addition to the quality metric Q. In this case, the maximum length of the region defined by excluding the non-biometric region from the foreground region may be taken to represent the width of the body part contacting the sensor.

If, in a given sub-image, the width of the body part contacting the sensor becomes larger than a contact width threshold value, the reading start/end timing determining unit 46 determines that the time of acquisition of that given sub-image represents the reading start timing. Alternatively, if, in a given sub-image, the width of the body part contacting the sensor becomes larger than the contact width threshold value and, at the same time, the quality metric Q becomes higher than the reading start threshold value, the reading start/end timing determining unit 46 determines that the time of acquisition of that given sub-image represents the reading start timing. The contact width threshold value is set smaller than the average width of the body part to be read; for example, it is set equal to one quarter to one half of the average width of the body part.

The reading start/end timing determining unit 46 may set two-stage conditions to determine the reading start timing. For example, the reading start threshold value and/or the contact width threshold value in the first stage are set lower than the reading start threshold value and/or the contact width threshold value in the second stage. Then, if the quality metric Q or the contact width acquired from the sub-image satisfies the first stage condition, the reading start/end timing determining unit 46 temporarily stores the sub-image that satisfied the first stage condition and any subsequently acquired sub-image in the storage unit 3. Thereafter, if the quality metric Q or the contact width acquired from any given sub-image satisfies the second stage condition, the processing unit 4 transmits a reading start indicating signal to other apparatus connected via the interface unit 5 and thereby notifies the user that the reading of the biometric information has been started. When the notification of the reading end timing is received from the reading start/end timing determining unit 46, the processing unit 4 retrieves from the storage unit 3 the sub-images acquired during the time interval between the first stage condition being satisfied and the notification of the reading end timing, and passes them to the image combining unit 47.

Since the user's body part is rubbed against the sensor surface, residues such as skin tissue or sweat adhere to the sensor surface when the reading of the biometric information is completed. As a result, a pattern corresponding to the skin tissue or sweat left on the sensor surface may appear on the sub-image acquired when the reading of the biometric information is completed. In this case, if the reading end threshold value is set low, the reading start/end timing determining unit 46 may not be able to properly determine the reading end timing, though actually the user has already finished moving his body part across the sensor surface. If a body part contact detector is provided in close proximity to the sensor unit, since the detection range of such a body part contact detector does not cover the sensor surface, it is difficult to detect whether a body part is in contact with the sensor surface or not by using the body part contact detector. If the reading end timing is not determined properly, the initiation of the subsequent matching process to be performed using the biometric image has to be delayed, which increases the time taken to complete the biometric authentication process and impairs the user's convenience. In view of this, the reading end threshold value is set to a relatively high value, for example, to about 0.5 to 0.8 so that the end of the reading can be reliably determined.

Alternatively, the reading start/end timing determining unit 46 may obtain an maximum value $Q_{max}$ of the quality metrics calculated for the sub-images acquired after the reading start timing, and may determine the reading end threshold value based on the maximum value $Q_{max}$. In this case, the reading end threshold value is set, for example, to one half of the quality metric maximum value $Q_{max}$.

There are also cases where the body part to be read contains a crack-like streak or scar extending in the horizontal direction. In such cases, if the reading end timing is determined based on the quality of only one sub-image, the reading start/end timing determining unit 46 may erroneously determine that the timing of acquisition of the sub-image corresponding to such a streak or scar represents the reading end timing.

In view of this, the reading start/end timing determining unit 46 may determine the reading end timing by detecting that the quality metrics Q of a plurality of sub-images successively acquired for a predetermined period of time after the reading start timing have all been judged not higher than the reading end threshold value. In this case, the reading start/end timing determining unit 46 may determine that the time of acquisition of the sub-image whose quality metric first dropped to or below the reading end threshold value, among the plurality of sub-images successively acquired for the predetermined period of time, represents the reading end timing. By determining the reading end timing based on whether the quality metrics Q have been judged not higher than the reading end threshold value successively for a given period of time, the reading start/end timing determining unit 46 can prevent the reading end timing from being erroneously detected. The predetermined period of time here is set, for example, to 0.1 to 0.3 msec.

The quality judging unit 44 takes the plurality of sub-images acquired during the time interval between the reading start timing and the reading end timing, and calculates the sum of the numbers of pixels contained in the respective foreground regions and the sum of the numbers of pixels contained in the respective non-biometric region. Then, by substituting the sum of the numbers of pixels contained in the foreground regions and the sum of the numbers of pixels contained in the non-biometric region into the earlier given equation (8), the quality judging unit 44 obtains the quality metric Q for the biometric image constructed by combining the plurality of sub-images acquired during the time interval between the reading start timing and the reading end timing. If the quality metric Q is lower than the quality threshold value $T_q$, the quality judging unit 44 judges that the biometric image is defective. On the other hand, if the quality metric Q is equal to or higher than the quality threshold value $T_q$, the quality judging unit 44 judges that the quality of the biometric image is good.

In this embodiment also, if the sum of the numbers of pixels contained in the foreground regions is smaller than the predefined area threshold value $T_s$, the quality judging unit 44 may judge that the biometric image is defective.

The quality threshold value $T_q$ and area threshold value $T_s$ are determined in the same manner as the earlier described embodiment.

The image combining unit 47 constructs the biometric image by combining, in time series in the vertical direction, the plurality of sub-images acquired during the time interval between the reading start timing and the reading end timing. If it is judged by the quality judging unit 44 that the quality of the biometric image is good, the image combining unit 47 supplies the biometric image to other apparatus connected via the interface unit 5.

On the other hand, if it is judged by the quality judging unit 44 that the quality of the biometric image is not good, the image combining unit 47 discards the biometric image.

Figure 10:
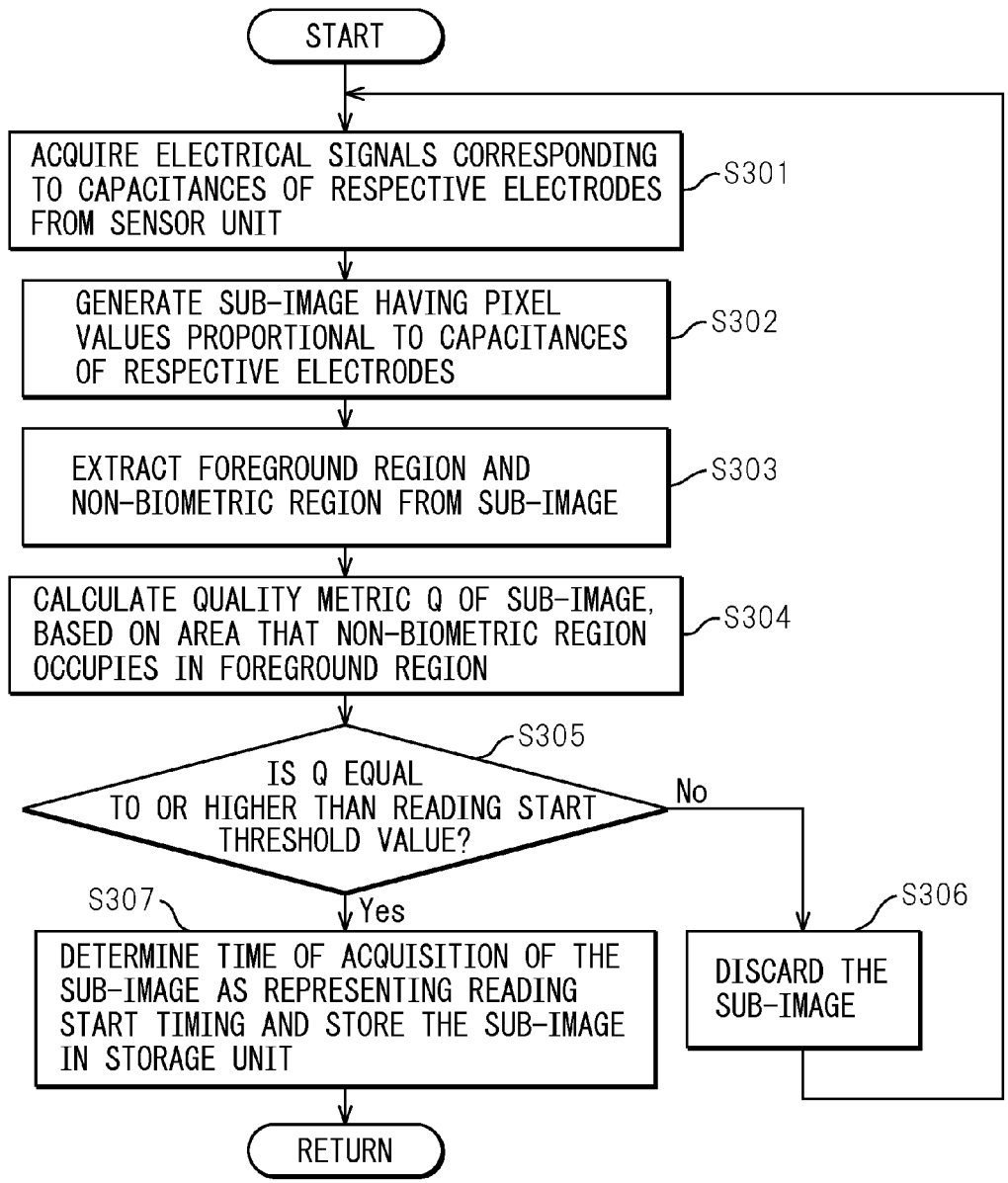
FIG. 10 is a diagram illustrating an operation flowchart of a reading start timing determining process which is performed under the control of the processing unit.

FIG. 10 is a diagram illustrating an operation flowchart of a reading start timing determining process which is performed under the control of the processing unit 4.

The processing unit 4 acquires from the sensor unit 2 electrical signals corresponding to the capacitances of the respective electrodes (step S301).

Each time the electrical signals read out of the electrodes are acquired from the sensor unit 2, the image generating unit 41 in the processing unit 4 generates a sub-image having pixel values proportional to the capacitances of the respective electrodes (step S302). The image generating unit 41 passes the generated sub-image to the foreground region extracting unit 42, the non-biometric region detecting unit 43, the reading start/end timing determining unit 46, and the image combining unit 47 in the processing unit 4.

The foreground region extracting unit 42 extracts the foreground region from the sub-image. The non-biometric region detecting unit 43 extracts the non-biometric region from the foreground region (step S303). Then, the non-biometric region detecting unit 43 passes the number of pixels contained in the foreground region and the number of pixels contained in the non-biometric region to the reading start/end timing determining unit 46 in the processing unit 4.

The reading start/end timing determining unit 46 calculates the quality metric Q of the sub-image, based on the area that the non-biometric region occupies in the foreground region (step S304). Then, the reading start/end timing determining unit 46 determines whether or not the quality metric Q is equal to or higher than the reading start threshold value (step S305).

If the quality metric Q is lower than the reading start threshold value (No in step S305), the reading start/end timing determining unit 46 discards the sub-image (step S306). Then, the processing unit 4 returns to step S301 to repeat the above process. On the other hand, if the quality metric Q is equal to or higher than the reading start threshold value (Yes in step S305), the reading start/end timing determining unit 46 determines that the time of acquisition of the sub-image corresponding to that quality metric Q represents the reading start timing. The reading start/end timing determining unit 46 stores the sub-image corresponding to that quality metric Q in the storage unit 3 (step S307). Then, the processing unit 4 terminates the reading start timing determining process.

Figure 11:
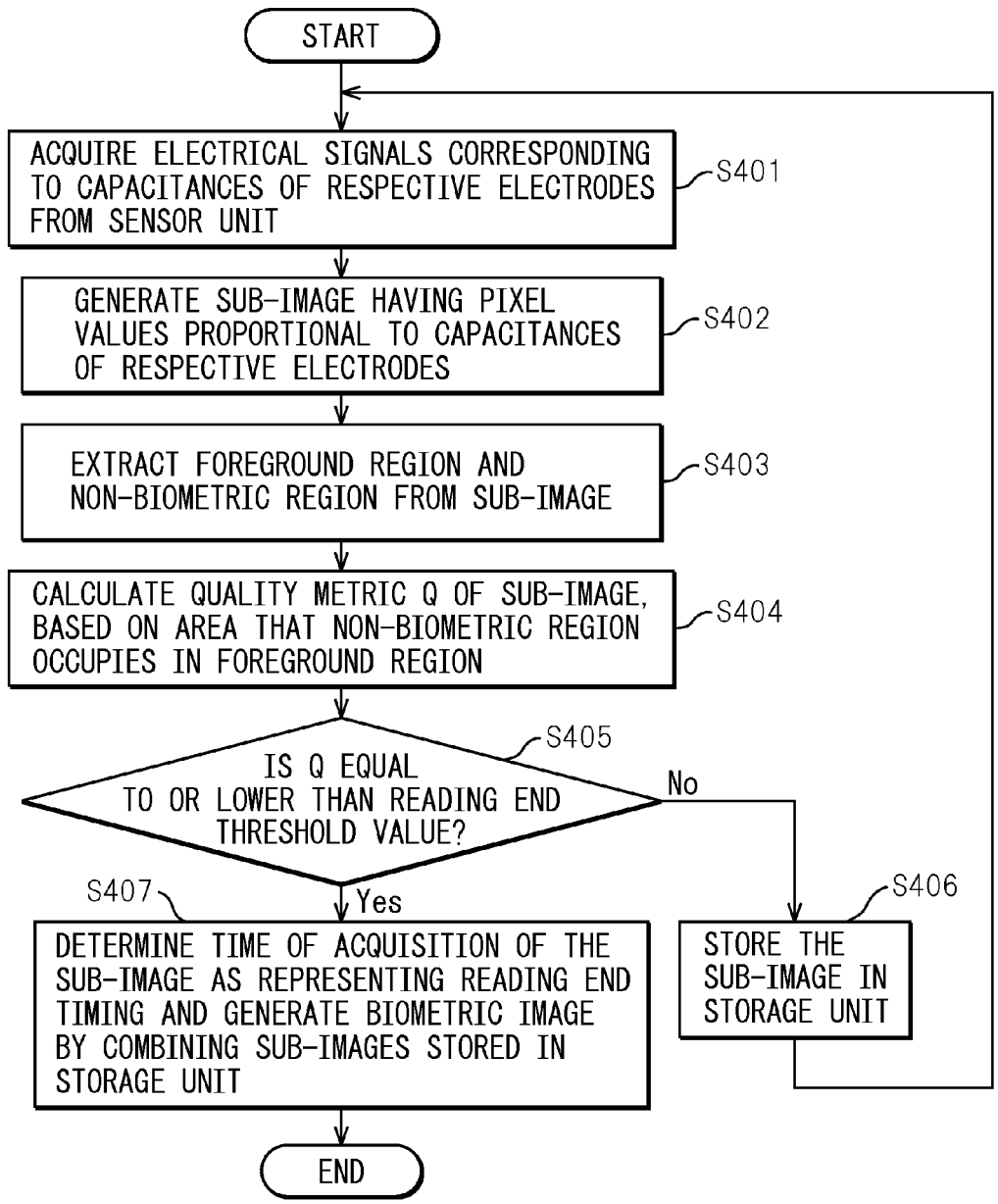
FIG. 11 is a diagram illustrating an operation flowchart of a reading end timing determining process which is performed under the control of the processing unit.

FIG. 11 is a diagram illustrating an operation flowchart of a reading end timing determining process which is performed under the control of the processing unit 4.

The processing unit 4 acquires from the sensor unit 2 electrical signals corresponding to the capacitances of the respective electrodes (step S401).

Each time the electrical signals read out of the electrodes are acquired from the sensor unit 2, the image generating unit 41 in the processing unit 4 generates a sub-image having pixel values proportional to the capacitances of the respective electrodes (step S402). The image generating unit 41 passes the generated sub-image to the foreground region extracting unit 42, the non-biometric region detecting unit 43, the reading start/end timing determining unit 46, and the image combining unit 47 in the processing unit 4.

The foreground region extracting unit 42 extracts the foreground region from the sub-image. The non-biometric region detecting unit 43 extracts the non-biometric region from the foreground region (step S403). Then, the non-biometric region detecting unit 43 passes the number of pixels contained in the foreground region and the number of pixels contained in the non-biometric region to the reading start/end timing determining unit 46 in the processing unit 4.

The reading start/end timing determining unit 46 calculates the quality metric Q of the sub-image, based on the area that the non-biometric region occupies in the foreground region (step S404). Then, the reading start/end timing determining unit 46 determines whether or not the quality metric Q is equal to or lower than the reading end threshold value (step S405).

If the quality metric Q is higher than the reading start threshold value (No in step S405), the reading start/end timing determining unit 46 stores the sub-image in the storage unit 3 (step S406). Then, the processing unit 4 returns to step S401 to repeat the above process. On the other hand, if the quality metric Q is equal to or lower than the reading end threshold value (Yes in step S405), the reading start/end timing determining unit 46 determines that the time of acquisition of the sub-image corresponding to that quality metric Q represents the reading end timing. Then, the processing unit 4 passes the sub-images stored in the storage unit 3 to the image combining unit 47. The image combining unit 47 constructs the biometric image by combining, in time series in the vertical direction, the plurality of sub-images acquired during the time interval between the reading start timing and the reading end timing (step S407). Then, the processing unit 4 terminates the reading end timing determining process.

As has been described above, even when an electrical conductor other than a person's body part is left adhering to the sensor surface, the capacitive sensor according to the present embodiment can properly determine the reading start timing and the reading end timing by detecting the arrangement pattern of the electrodes having different parasitic capacitances. Since the non-biometric region contained in the biometric image can thus be reduced, the capacitive sensor can generate a biometric image suitable for use for biometric authentication. Furthermore, since the biometric authentication process can be initiated immediately after completion of the biometric information reading, the capacitive sensor can reduce the time that has to be waited until the biometric authentication process ends.

According to a further alternative embodiment, the processor of the apparatus connected to the capacitive sensor may implement the functions of the processing unit of each of the above embodiments. In this case, the capacitive sensor first amplifies the signals read out of the respective electrode and converts the amplified signals into digital signals, and then supplies the analog-to-digital converted electrode signals in a predetermined order to the apparatus connected via the interface unit.

All of the examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A capacitive sensor comprising:
a plurality of electrodes each of which outputs an electrical signal corresponding to a capacitance determined by a distance between a surface of the capacitive sensor and an electrical conductor,
wherein the plurality of electrodes include electrodes having a first parasitic capacitance and electrodes having a second parasitic capacitance different from the first parasitic capacitance and are arranged in a prescribed pattern different than a pattern of biometric information of a body part to be read by the capacitive sensor, and the prescribed arrangement pattern is one of a checkerboard pattern and a striped pattern.

2. The capacitive sensor according to claim 1, wherein the prescribed arrangement pattern is higher in resolution than the pattern of the biometric information of the body part to be read by the capacitive sensor.

3. The capacitive sensor according to claim 1, further comprising a processing unit adapted to
generate an image in which each of the plurality of electrodes corresponds to one pixel and each pixel has a pixel value proportional to an electrical signal output from a corresponding one of the plurality of electrodes;
extract from the image a foreground region which is a region that contains pixels at each of which an electrical conductor is located at a distance capable of forming a capacitor with a corresponding one of the plurality of electrodes;
calculate correlation between the foreground region and a filter that matches the prescribed arrangement pattern, and thereby detects a non-biometric region formed by a non-biometric electrical conductor adhering to a sensor surface of the capacitive sensor; and
calculate a metric that decreases as the area that the non-biometric region occupies in the foreground region increases, and outputs the image if the metric is higher than a predefined threshold value but discards the image if the metric is not higher than the predefined threshold value.

4. The capacitive sensor according to claim 3, wherein the plurality of electrodes are arranged in a two-dimensional array.

5. The capacitive sensor according to claim 1, further comprising a processing unit adapted to
while the body part to be read by the capacitive sensor is being moved slidingly over the plurality of electrodes, generate at prescribed time intervals sub-images in which each of the plurality of electrodes corresponds to one pixel and each pixel has a pixel value proportional to an electrical signal output from a corresponding one of the plurality of electrodes;
extract from each of the sub-images a foreground region which is a region that contains pixels at each of which an electrical conductor is located at a distance capable of forming a capacitor with a corresponding one of the plurality of electrodes;
calculate, for each of the sub-images, correlation between the foreground region and a filter that matches the prescribed arrangement pattern, and thereby detects a non-biometric region formed by a non-biometric electrical conductor adhering to a sensor surface of the capacitive sensor; and
calculate a metric that decreases as the area that the non-biometric region occupies in the foreground region increases, determines that the time of acquisition of a sub-image whose metric first exceeded a first threshold value represents a reading start timing of the biometric information and that the time of acquisition of a sub-image whose metric first dropped below a second threshold value, among the sub-images acquired after the reading start timing, represents a reading end timing of the biometric information, and generate a biometric image by combining the sub-images acquired during a time interval between the reading start timing and the reading end timing.

6. The capacitive sensor according to claim 5, wherein the first threshold value is smaller than the second threshold value.

7. A biometric image generating method using a capacitive sensor, the capacitive sensor comprising a plurality of electrodes each of which outputs an electrical signal corresponding to a capacitance determined by a distance between a surface of the sensor and an electrical conductor, wherein the plurality of electrodes include electrodes having a first parasitic capacitance and electrodes having a second parasitic capacitance different from the first parasitic capacitance and are arranged in a prescribed pattern different than a pattern of biometric information of a body part to be read, the method comprising:
generating an image in which each of the plurality of electrodes corresponds to one pixel and each pixel has a pixel value proportional to an electrical signal output from a corresponding one of the plurality of electrodes;
extracting from the image a foreground region which is a region that contains pixels at each of which an electrical conductor is located at a distance capable of forming a capacitor with a corresponding one of the plurality of electrodes;
calculating correlation between the foreground region and a filter that matches the prescribed arrangement pattern, and thereby detecting a non-biometric region formed by a non-biometric electrical conductor adhering to a sensor surface of the capacitive sensor; and
calculating a metric that decreases as the area that the non-biometric region occupies in the foreground region increases, and outputting the image if the metric is higher than a predefined threshold value, but discarding the image if the metric is not higher than the predefined threshold value.

* * * * *